(12) United States Patent
Wynman

(10) Patent No.: US 8,681,600 B2
(45) Date of Patent: Mar. 25, 2014

(54) OPTICAL NETWORK TERMINAL BATTERY BACK-UP CONTROL

(75) Inventor: Stanley J. Wynman, Bogota, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1481 days.

(21) Appl. No.: 11/960,027

(22) Filed: Dec. 19, 2007

(65) Prior Publication Data

US 2008/0240367 A1    Oct. 2, 2008

Related U.S. Application Data

(60) Provisional application No. 60/908,974, filed on Mar. 30, 2007.

(51) Int. Cl.
*G01R 31/08*    (2006.01)

(52) U.S. Cl.
USPC .......................................................... 370/216

(58) Field of Classification Search
USPC .......... 370/216, 242; 379/2, 9.05, 207.1, 307, 379/395.01, 322–324, 348, 379, 379/413–413.01; 398/15, 38, 94, 115–6, 398/197, 2
See application file for complete search history.

(56) References Cited

U.S. PATENT DOCUMENTS

| 5,003,578 | A | * | 3/1991 | Lin ........................... 379/102.04 |
|---|---|---|---|---|
| 5,381,472 | A | * | 1/1995 | Kobayashi et al. ...... 379/395.01 |
| 6,335,861 | B1 | * | 1/2002 | Ramsey et al. .......... 361/679.21 |
| 7,369,771 | B2 | | 5/2008 | Lee et al. |
| 7,751,711 | B2 | | 7/2010 | Wynman |
| 2002/0063924 | A1 | | 5/2002 | Kimbrough et al. |
| 2003/0123648 | A1 | * | 7/2003 | Ashton et al. ................. 379/403 |
| 2006/0029389 | A1 | * | 2/2006 | Cleary et al. .................... 398/33 |
| 2006/0053309 | A1 | * | 3/2006 | Vereen et al. ................. 713/300 |
| 2008/0152125 | A1 | * | 6/2008 | Stoneback .................... 379/413 |
| 2008/0240367 | A1 | | 10/2008 | Wynman |
| 2012/0088987 | A1 | * | 4/2012 | Braun et al. .................. 600/301 |

\* cited by examiner

*Primary Examiner* — Mark Rinehart
*Assistant Examiner* — Peter Cheng

(57) ABSTRACT

A system and method for permitting a customer of a telecommunication company, for whom fiber to the premises (FTTP) has been installed, to continue to use the telephone during utility company power failure, by powering both the optical network terminal (ONT) and the customer's telephone(s). The battery backup unit (BBU) maintains telephone usage for a predetermined period of time after power failure, e.g., two hours, consistent with duration of most utility company power outages. This permits non-interrupted telephone service for most outages and, after that period of time, if utility company power has not been restored, the BBU provides power in order to provide telephone service only on demand by the customer, for up to approximately two more cumulative hours of usage. At the end of each usage on demand, the BBU powers the telephone for approximately five more minutes to permit return phone calls, if any, after which telephone service is shut off until any next usage on demand.

10 Claims, 3 Drawing Sheets

OPTICAL NETWORK TERMINAL BATTERY BACK-UP CONTROL

RELATED APPLICATIONS

This application claims the benefit of U.S. provisional patent application 60/908,974, filed Mar. 30, 2007, the contents of which are incorporated herein by reference in their entirety.

BACKGROUND

Fiber optic infrastructure now being deployed by certain telecommunication companies can be operatively connected to customer premises. Such fiber optic infrastructure offers many advantages over traditional copper-wire cabling, including vastly increased bandwidth.

The well known plain old telephone system (POTS) operated, and still operates, with copper wiring. POTS is now being made compatible with fiber optic cabling.

However, a POTS telephone system in combination with fiber optic infrastructure involves certain optically-related and/or other functionality not previously utilized in the traditional all-copper systems. For example, an optical line terminal (OLT) is now typically located in a central office of the telecommunications company or at some other regional location (but typically not on customer premises).

The central office OLT can be communicatively coupled via fiber optic cable to an Optical Network Terminal (ONT) located at or near the customer premises. The ONT can be situated immediately outside of a customer premise (e.g., mounted on an outside wall several feet above ground). However, the ONT is, more and more, being placed inside the customer premises, where space is typically at a premium.

The ONT may be powered, for example, by a power supply such as that described in U.S. patent application Ser. No. 11/144,566, filed Jun. 3, 2005, which claims the benefit of U.S. Provisional Application Ser. No. 60/576,675, filed Jun. 3, 2004, and which is incorporated by reference herein in its entirety. Such a power supply can, in turn, be powered by typical electric utility company power which is subject to power failure for reasons including, without limitation, natural disasters and terrorist attacks.

During a utility company power failure, traditional POTS telephone service over copper wiring is ordinarily able to continue because of POTS battery back-up infrastructure which is in place at telecommunication company central offices. This battery backup system is designed to maintain POTS telephone service for an entire community. However, that otherwise-available emergency POTS telephone service shall not be available to a telephone customer using a Fiber-to-the-Premises (FTTP) system, if the ONT at the customer premise cannot communicate with the central office OLT via the fiber optic cable due to the ONT lacking power as a result of the power failure.

Consequently, battery backup has also been provided within the FTTP environment for the ONT and for customer telephone instruments connected to the ONT. But, if such a backup battery is used in a less than optimum manner, it can be quickly depleted. In such case, the customer shall have no back-up power with which to make telephone calls, including emergency telephone calls. Also, large back-up batteries consume more space than smaller back-up batteries, and with the ONT now often being located inside the premises, the issue of battery size becomes more important than when the ONT was located outside. Thus, there is a need for controlling battery back-up in an improved and efficient manner while using a smaller rather than a larger battery.

DETAILED DESCRIPTION OF PREFERRED EMBODIMENTS

Exemplary embodiments can include methodology and apparatus for managing an ONT under conditions of a general utility company power failure. In one embodiment, a residential fiber optic communication system is powered by electricity from a utility company. The system permits communication via customer premises equipment (CPE) including a telephone in a normal mode of operation. An OLT is located remotely from the customer premises, and can be located in a central office of the telephone company associated with the customer's telephone. An ONT is located at the customer premises and is in communication over a fiber optic cable with the OLT. A DC power supply is located at the customer premises for purpose of supplying electrical power to the customer's ONT and to the customer's telephone(s) via the ONT. A rechargeable battery backup unit (BBU) is located at the customer premises and is rechargeable by the power supply. The BBU is operatively coupled to the ONT and to the customer's telephone(s) via the ONT for the purpose of supplying substitute electrical power to the ONT and to the telephone(s) if and when the utility company electric power fails.

In such case, the BBU is disconnected from providing power to the ONT and the telephone for purposes of permitting a telephone call to be made (referred to herein as "service power") at the end of a first pre-determined time period measured from the onset of utility company power failure. For example, the first pre-determined time period can be two hours, thereby allowing two hours of uninterrupted service during the power failure. If the telephone goes off-hook (e.g., customer picks up the telephone to use it) at a time after the end of the first pre-determined time period, that is sensed and, responsive to that off hook, service power from the BBU is reapplied to the telephone and to the ONT to permit a call to be made. After the call is terminated, service power from the BBU to the telephone and to the ONT is maintained for a second pre-determined time period, and afterwards service power from the BBU is disconnected from the telephone and the ONT. For example, the second pre-determined time period can be five minutes. In response to any subsequent off-hook, service power from the BBU can be reapplied and maintained as described above. The process can be repeated until the batteries have discharged to an inadequate level.

This application incorporates by reference, in its entirety, U.S. patent application Ser. No. 11/460,499, entitled "OPTICAL NETWORK TERMINAL POWER FAILURE MANAGEMENT" and filed Jul. 27, 2006.

Figure 1:
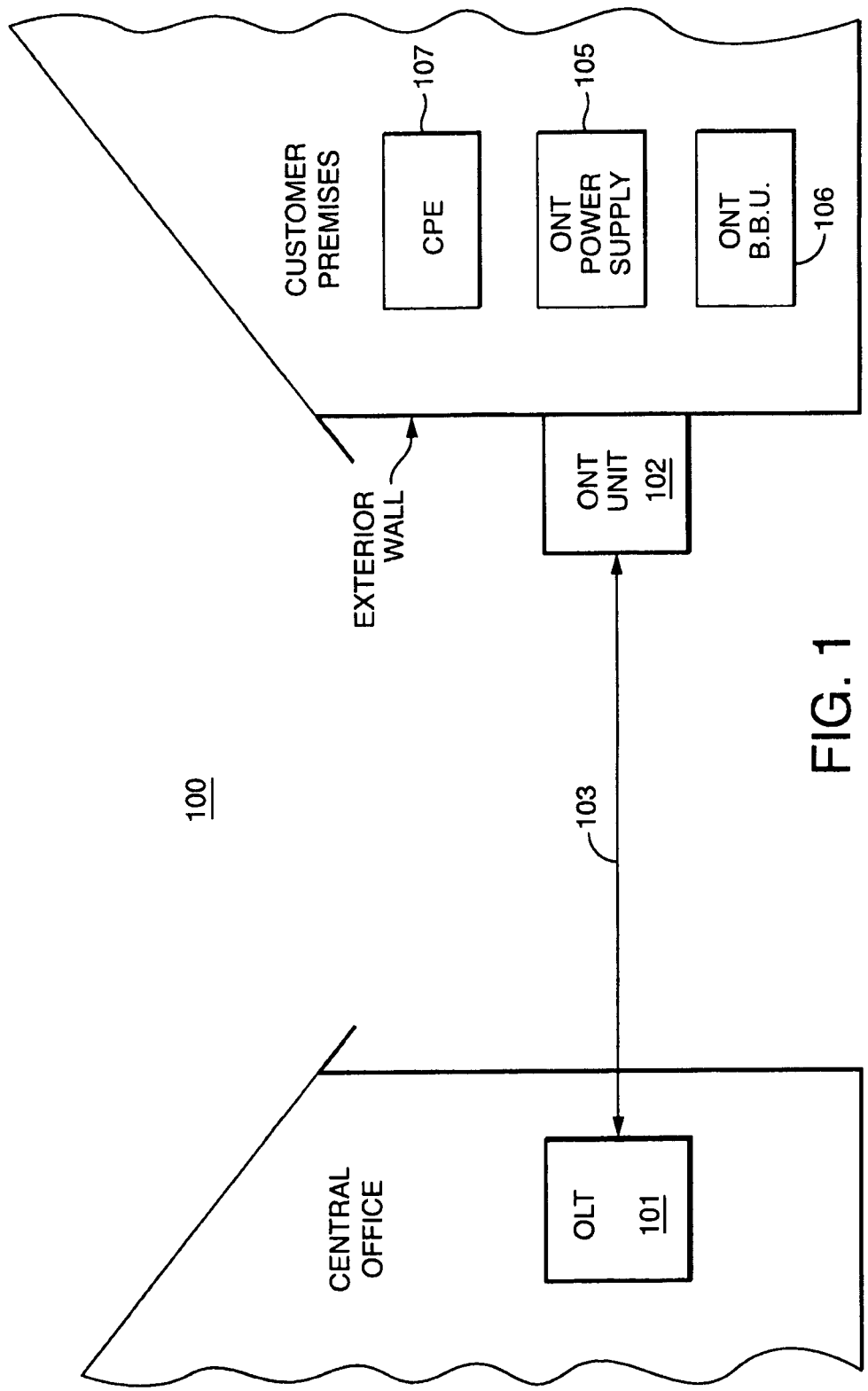
FIG. 1 depicts an exemplary FTTP communication system showing the locations of various system components, including an ONT unit shown outside of a customer premises (it will be understood that the ONT can be situated inside the customer premises as well)

Referring to FIG. 1, fiber to the premises (FTTP) system 100 is depicted. A telecommunication company's central office is shown at the left-hand side of the drawing, housing optical line terminal (OLT) 101. Other equipment such as switches, routers, server computers, back-up batteries and other functionality (not shown) may be found in a central office, as known.

On the right hand side of the drawing a schematic profile of a customer's premises is provided with optical network terminal (ONT) 102 which may be mounted on the exterior wall of the customer's premises as shown. A typical outside mounting would put ONT 102 at about four-five feet above ground.

However, ONT 102 can be situated inside the customer premises. With an inside placement of ONT 102 (not shown), the physical size of the ONT can become an issue. For this reason, a smaller battery can be used in the BBU 106 which, in the inside placement configuration of ONT 102, is integrated with the ONT unit. In other words, in the inside placement configuration, ONT BBU 106 can be a component within ONT 102.

ONT 102 may be a standard fiber optical terminal which provides a suitable terminus for fiber optic cable 103. Other system components included within or at the customer premises include ONT power supply 105, BBU 106 as battery backup for ONT 102, and customer premises equipment (CPE) 107 which includes any residential-styled communication equipment such as telephones, facsimile devices, televisions, computer systems, etc. Either power supply 105 or BBU 106 or both may be physically located within the housing for ONT 102 when located inside the customer premises. It should be understood that electrical power is brought to the customer premises by an electrical utility company (not shown).

Signals received by OLT 101 over fiber optic cable 103 from ONT 102 may be processed in OLT 101 and may be forwarded to other equipment (not shown) located within the central office for further processing before routing those signals to their ultimate destination outside of the central office. In the opposite direction, signals to be forwarded from OLT 101 over fiber optic cable 103 to ONT 102 are received by the central office from a source or sources located outside of the central office, and may have been processed by other equipment (not shown) located within the central office and may be further processed by OLT 101 before being forwarded from OLT 101 over cable 103.

Figure 2:
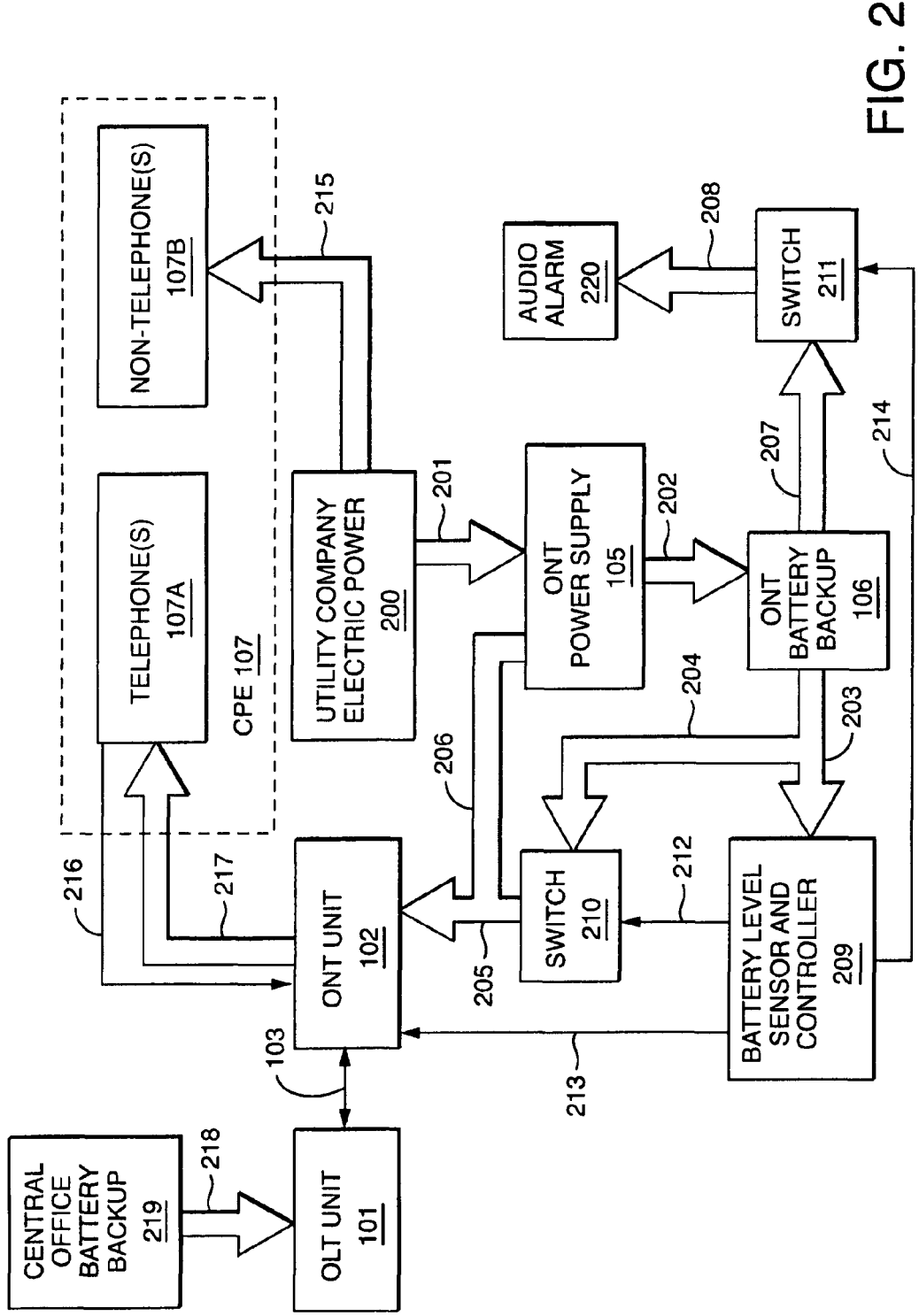
FIG. 2 is an exemplary schematic block diagram showing signal paths and power paths between various system components including those of FIG. 1.

FIG. 2 is a schematic block diagram showing signal paths and power paths between various system components, including those of FIG. 1. For clarity purposes, power paths are shown in wide-bus format and the signal paths are depicted as single line connectives. It will be understood that the thickness of the actual power cable and the thicknesses of the actual signal cables are not necessarily related to each other in the proportions shown in the drawing. Also, the spatial relationship shown in FIG. 1 may not be strictly maintained in FIG. 2. For example, the telephone company battery backup 219 in FIG. 2 can be physically located within the telecommunication company's central office, and the utility company's electric power, shown within FIG. 2 as block 200 for clarity of illustration, can be brought to the customer's premises in accordance with typical power distribution from a utility company.

In FIG. 2, customer premises equipment CPE 107 can include CPE107A (exclusively telephone or telephones) and CPE 107B (all non-telephonic consumer premises equipment such as televisions, etc.). Starting with the utility company electric power functionality 200, it can be seen that electric power is distributed to CPE 107B on power bus 215 and to ONT power supply 105 on power bus 201. ONT power supply 105, in turn, distributes power to ONT 102 over power bus 206/205 and to BBU 106 over power bus 202. BBU 106, in turn, and only if utility company electric power 200 has failed, distributes power to ONT 102 through power bus 203/204/205 by way of emergency switch 210, and distributes power to audio alarm 220 through power bus 207/208 by way of timer switch 211.

Power output from ONT 102 is supplied to the customer's telephone(s) 107A over power bus 217. This power is derived from ONT power supply 105 if there is no power failure, and is derived from ONT BBU 106 if there is a power failure.

In the upper left of FIG. 2, other power distribution is shown as deriving from the telephone company's central office battery backup 219, and as being distributed over power bus 218 to the central offices OLT unit 101. Therefore, if there is a power failure affecting both the customer's premises as well as the telephone company's central office, telephone company battery backup 219 substitute-powers the equipment located within the central office such as OLT 101, but does not supply substitute power to ONT 102 or to CPE 107.

Referring to battery level sensor and controller 209, (hereinafter "controller 209") at the lower left of FIG. 2, several signal paths emanate. Controller 209 includes functionality that senses the voltage level output of BBU 106 via power bus 203. When there has not been a power failure for some period of time, the batteries (not shown) of BBU 106 may be fully charged by power supply 105. When a power failure occurs, whereupon BBU 106 is pressed into service, output of the batteries of BBU 106 generally declines over time.

A sleep signal is sent over signal line 213 from controller 209 to ONT 102 requesting that ONT 102 enter a sleep or standby mode. This can occur at a first pre-determined time after utility company power failure (e.g., two hours, as it has been determined that approximately 94% of power outages in the United States last for two hours or less). During the first pre-determined time period, telephone operation is maintained. Assuming that the phone is not in use at the end of the first time period (and assuming in this example that the power outage has exceeded the first time period), the telephone service is shut down by removing service power from the telephone service device. This can be accomplished, for example, by opening switch 210 responsive to a command over signal path 212 from controller 209. But, in the event that the power outage has exceeded the first pre-determined period and the customer is using the phone at the end of the period, then the telephone service can be permitted to continue until the customer terminates the phone call (assuming adequate battery voltage level).

Once the first time period has expired and the telephone service has been powered down, if the customer subsequently requires use of the telephone, the customer can simply lift the phone switch hook and await a dial tone. Service power can then be reapplied for telephone service, and the customer can complete the call. Upon call completion, the telephone service can remain active for a second pre-determined period of time (e.g., a five or ten minute window in which another party could call the customer back). Upon expiration of the second period of time, the telephone service device can again power down. This process is repeatable until the battery capacity has diminished until an unusable level. Prior to reaching that unusable level, audio alarm 220 can be sounded to give warning to the customer of impending non-use of the telephone. This can be accomplished responsive to a control signal sent over signal path 214 from battery level sensor and controller 209. That signal would close switch 211 which then would permit battery backup 106 to apply power to alarm 220. This audio alarm level can be preset by the equipment supplier (e.g., sound alarm at fifteen minutes of battery life remaining).

After an AC utility company power failure, an uninterruptible power supply (UPS) BBU can provide power to the telephone device for the above-noted first pre-determined period of time. An internal clock can disconnect the telephone service device at the end of that period. The UPS/BBU can then place a small current on the line (referred to herein as "non-service power") which can be used to monitor the telephone and determine if it is on hook or off hook. Upon detection of the off hook condition, the UPS/BBU can re-apply service power to the telephone service device and continue to monitor it for an on-hook condition. Upon detecting the on hook condition, the second pre-determined period of time can begin, e.g., five minutes, after which the UPS/BBU can again remove service power from the telephone and again begin to monitor the telephone line for subsequent off-hook activity using non-service power. This can continue until the battery voltage diminishes to an unusable level.

In an exemplary embodiment, a four hour battery is chosen (e.g., one which can power the telephone and ONT for four hours continuously before it has discharged to an unusable level). This is a much smaller battery than previously used eight hour batteries and is more suitable for use inside the customer premises. Such an arrangement provides customers with un-interrupted service for the first two hours after power failure, during which time almost all power failures are resolved, statistically speaking. It also permits another two hours of "as-needed" calling potential, as described above.

Figure 3:
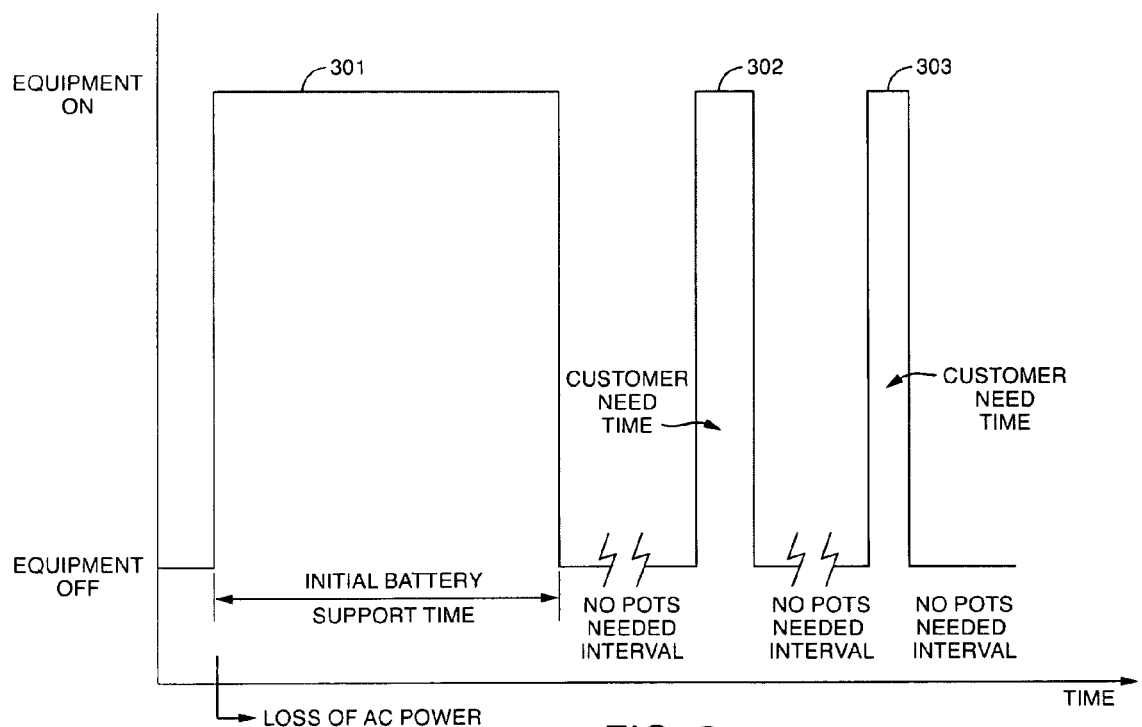
FIG. 3 is an exemplary graph showing usage of a battery backup unit (BBU).

FIG. 3 is an exemplary voltage-time profile of BBU usage consistent with the above description. As can be seen, the first predetermined time interval 301 starts when AC power is lost. Time intervals 302 and 303 show durations of phone calls made subsequent to, and which are shorter than, the initial pre-determined time interval 301. If needed, a customer can, with a four hour battery in the BBU, and with the first pre-determined time interval being equal to two hours, make a four hour phone call starting with the power outage, but after which the phone would no longer have any power. More typically, such a customer would attempt to conserve power and would then have opportunities to make many calls of short duration subsequent to the running of the first pre-determined time period.

This concept allows for the extended use of POTS service using a smaller battery than currently deployed in FTTP systems. The smaller battery provides battery back up to support the ONT for a period determined to cover the majority of power outages while holding power in reserve which allows a customer to make phone calls over an extended period of time, but with a defined total POTS usage ability.

Exemplary embodiments maximize a customer's ability to make and potentially receive telephone calls, while maintaining an economical perspective of battery back up time. As noted above, currently approximately 94% of the power outages in the United States last for 2 hours or less. As a result, basic battery back up time should accommodate this 2 hour period of time in which telephone operation is maintained. Assuming that the phone is not in use at the completion of the 2 hour period (assuming that the power outage has exceeded 2 hours), the telephone service device 107A can be shut down via the removal of service power.

In the event the power outage has exceed the 2 hour period immediately and the customer is using the phone, the telephone service device can continue to operate until the customer terminates the call.

If the customer requires use of the phone, the customer lifts the phone switch hook and waits until dial tone is present. The customer can then complete their call. Upon completion of the call, the telephone service device remains active for a second predetermined period of time. Upon expiration of the second period, the telephone service device once again shuts down. This process is repeatable until the battery capacity has diminished to an unusable level.

Advantageously, this scenario does not require the modification of the telephone service device. The UPS/BBU can be used as an interim device in which a telephone pair of wires passes through. This moves the point of demarcation from the telephone service device to the UPS/BBU.

Once AC power is removed, the UPS/BBU provides power to the telephone service device for a predetermined period of time. An internal clock disconnects the telephone service device. The UPS/BBU then places non-service power on the line which is used to monitor the telephone set being on hook or off hook. Upon detection of the telephone set being taken off hook, the UPS/BBU re-applies service power to the telephone service device and continues to monitor the telephone line for an on-hook condition. After 5 minutes passes, the UPS/BBU removes service power from the telephone service device and re-enters the telephone line monitoring mode.

While illustrative embodiments of the present invention have been shown and described, numerous variations and alternative embodiments may be possible. For example, although the above described first and second time periods have been described as predetermined, it will be appreciated that they can be dynamically adjusted during system operation (e.g., according to a predetermined program or in response to measurements of various parameters). Thus, other variations and alternative embodiments are contemplated, and can be made without departing from the scope of the present invention as defined in the appended claims.

What is claimed is:

1. A residential fiber optic communication system powered by utility company electric power, said system permitting communication via customer premises equipment (CPE) including a telephone in a normal mode of operation, said system comprising:
   an optical line terminal (OLT) located remotely from said customer premises;
   an optical network terminal (ONT) located in said customer premises in communication over a fiber optic cable with said (OLT);
   a DC power supply located in said customer premises for supplying electrical power to said ONT and to said telephone via said ONT;
   a rechargeable battery backup unit (BBU) located in said customer premises and rechargeable by said power supply, said BBU being operatively coupled to said ONT and to said telephone via said ONT to supply substitute electrical power to said ONT and to said telephone via said ONT if and when said utility company electric power fails; and
   a controller communicatively coupled to said BBU and configured to
      apply said substitute electrical power to said telephone at onset of failure of power from said utility company to provide un-interrupted telephone service and disconnect service power from said BBU to said telephone at the end of a first time period measured from said onset of failure of power from said utility company unless said telephone is off-hook at the end of said first time period and, if said telephone is off-hook at the end of said first time period, disconnect said service power to said telephone concurrent with termination of said off-hook after the end of said first predetermined time period and during said utility company power failure, sense if said telephone goes off hook again at a time after the end of said first time period and during said utility-company power failure and, responsive to said off hook again, reapply service power from said BBU to said telephone to permit a call to be made, and maintain service power from said BBU to said telephone for a second time period occurring during said utility-company power failure after which service power from said BBU is again disconnected from said telephone, said again disconnection occurring during said utility-company power failure.

2. A method, comprising:

automatically applying substitute service power from a battery backup unit (BBU) to a telephone at start of a utility-company power failure to provide un-interrupted telephone service and disconnecting said substitute service power at the end of a first pre-determined time period measured from the start of said power failure, said BBU and said telephone both located at a customer premises;

re-connecting said service power from said BBU to said telephone when said telephone goes off-hook subsequent to the end of the first pre-determined time period and during said utility-company power failure to obtain a first re-connection; and preventing said automatically disconnecting if said telephone is off-hook at the end of said first predetermined time period but thereafter disconnecting said service power provided by said BBU to said telephone concurrent with termination of said off-hook after the end of said first predetermined time period and during said utility company power failure.

3. The method of claim 2 further comprising:

automatically terminating, said first re-connection at the end of a second pre-determined time period measured from the termination of said off-hook.

4. The method of claim 3 wherein each subsequent off-hook obtains a respective subsequent re-connection between said telephone and said BBU.

5. The method of claim 4 wherein each said subsequent reconnection is automatically terminated at the end of a subsequent pre-determined time period measured from termination of its respective off-hook.

6. The method of claim 5 wherein said subsequent pre-determined time period is the same as said second pre-determined time period.

7. The method of claim 3 wherein said second pre-determined time period is five minutes.

8. The method of claim 2 wherein said first pre-determined time period is two hours.

9. Apparatus comprising:

a battery backup unit (BBU) located at a customer premises for powering a telephone during a utility-company power failure;

a controller communicatively coupled to the BBU and located at the customer premises, the controller configured to automatically apply substitute service power from said BBU to said telephone at start of a utility-company power failure to provide un-interrupted service and disconnect said service power at the end of a first pre-determined time period measured from the start of said power failure unless said telephone is off-hook at the end of said first pre-determined time period and then disconnect service with termination of said off-hook after the end of said first predetermined time period and during said utility company power failure; and reconnect service power provided by said BBU to said telephone when said telephone goes off-hook subsequent to the end of the first predetermined time period and during said utility-company power failure to obtain a first re-connection.

10. The apparatus of claim 9, wherein the controller is further configured to:

automatically terminate said first re-connection at the end of a second pre-determined time period measured from the termination of said off-hook.

* * * * *